Aug. 21, 1951     E. C. MOSS     2,564,789
GAUGING APPARATUS

Filed July 12, 1946     2 Sheets-Sheet 2

INVENTOR
E.C. MOSS
BY
W.C. Parnell
ATTORNEY

Patented Aug. 21, 1951

2,564,789

UNITED STATES PATENT OFFICE 2,564,789

GAUGING APPARATUS

Earl C. Moss, Westfield, N. J., assignor to Western Electric Company, Incorporated, New York, N. Y., a corporation of New York Application July 12, 1946, Serial No. 683,179

2 Claims. (Cl. 33—174)

This invention relates to gauging apparatus and more particularly to apparatus for gauging location, form, and orientation of curved surfaces.

There are various instances in various arts in which an article has a part, portion or associated member formed with a curved surface whose form and positional relation to other elements of the article may be critically important. One illustrative example of such articles is the case of a two dimensional cam designed to be movable in more than one direction to effect an algebraic summation of two distinct motions in the motion of its follower. Such cams are found, for example, in various calculating devices and in some kinds of control devices. Another case of such an article is the ordinary screw propeller used in driving water borne vessels and air borne flying apparatus. Such screw propellers or "wheels," for short, are ordinarily multilobed, having two, three, or even more blades, and, naturally, must be carefully balanced, both statically and dynamically, to avoid troublesome vibration when run at high speed. Furthermore, since they act on and are reacted on by the fluid in and on which they work, it is necessary that their effective forms as well as their effective masses be accurately balanced against each other if vibration is to be avoided. If one blade, for example, be more effective in its thrust against the fluid than the others, it will tend to produce the same kind of vibrational perturbation as if it were out of dynamic balance with the other blades.

An object of the present invention is to provide a simple, effective, reliable, and durable apparatus for gauging an article of the general character above described.

With the above and other objects in view, the invention may be illustratively embodied in a gauging apparatus comprising a base, means to support an article to be gauged on the base, a gauging member movable in one direction into and out of accurately predetermined positional relation to a specific portion of an article so supported and shiftable in another direction to be brought in like fashion into like relation to another specific portion of the article, means to releasably lock the gauging member in either of said positional relations, a measuring member movable but not shiftable with the gauging member, and cooperating means on the gauging member and on the measuring member to measure the distance between the two specific portions of the article.

Other objects and features of the invention will appear from the following detailed description of an embodiment thereof taken in connection with the accompanying drawings in which the same reference numerals are applied to identical parts in the several figures and in which Fig. 1 is a view in left hand side elevation and partly in section of a gauging apparatus embodying the invention;

Figure 1:
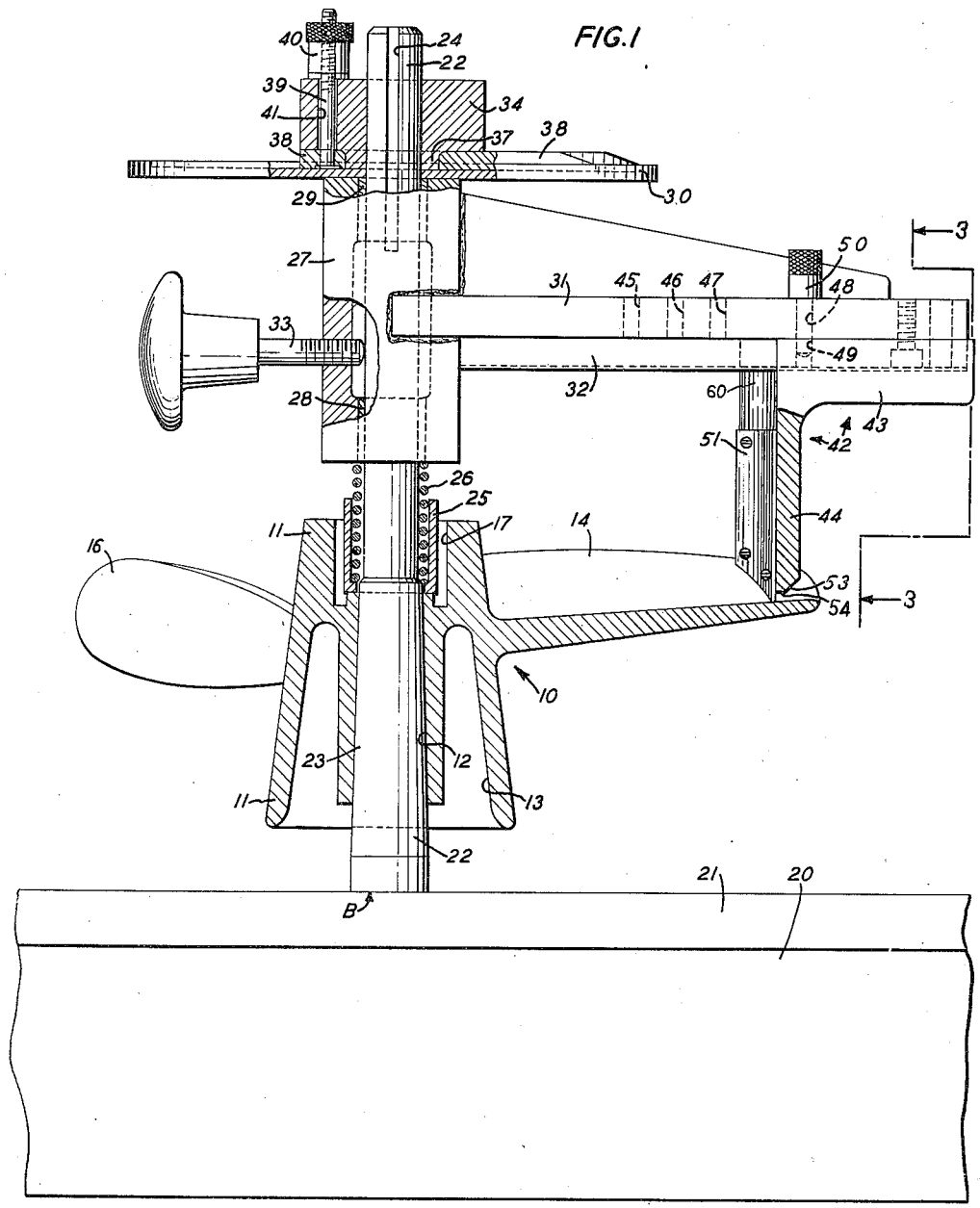
Figure 2:
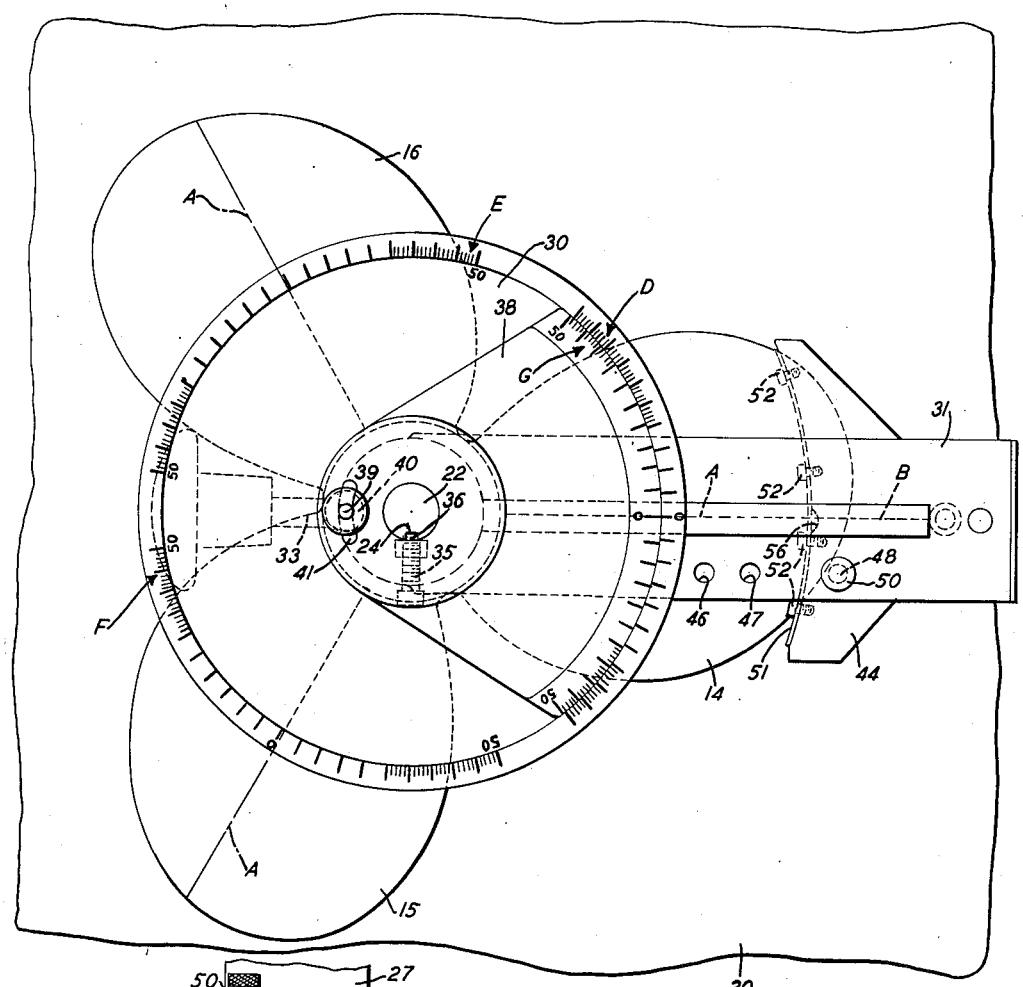
Fig. 2 is a plan view thereof.
Figure 3:
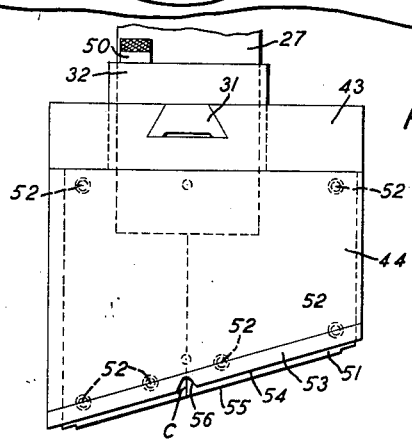
Fig. 3 is a front elevation of a part of the showing of Figs. 1 and 2.

The illustrative embodiment of the invention herein disclosed is a gauging apparatus whose purpose is to gauge the angular spacing of two or more members radiating from a common axis of an article, the particular article selected for illustration being a three bladed marine propeller wheel, generally indicated at 10, which has a hub 11, formed with a downwardly wideningly tapered axial bore 12, an annular lightening recess 13, and three, identically similar, integral, radially disposed blades 14, 15, and 16. The upper part of the bore 12 is counterbored as at 17. The three blades being identically alike in form, any description of any one of them is also a description of either of the other two. The upper surfaces of the blades, as these are oriented in Figs. 1 and 2, are substantially true helicoids having for their common axis the axis of the bore 12, although near the edges of the blades they are chamfered and rounded down. Hence, the intersection of any vertical plane through the axis with the upper surface of a blade is a straight line over all the significant part of its length, which, in the particular high speed marine wheel selected for illustration here, is at less than a right angle upwardly to the axis and therefore is tilted up slightly in Figs. 1 and 2. There is in any blade one such line in particular, indicated at A in each of the blades 14, 15, and 16, such that, when the wheel is in operation, the integrated pressures over the areas on the two sides of the A line are equal and there is no torque about the A line as axis. It will be assumed, for present purposes, that a wheel to be gauged in the apparatus of the invention, has the A line of each blade already scribed or otherwise marked thereon.

The apparatus embodying the invention comprises a rigid base 20 having a flat, horizontal upper surface 21, the base 20 being rigidly supported by any suitable means, not shown. A vertical, stationary shaft 22 is rigidly mounted in the base with its axis accurately at right angles to the plane 21. The lower portion 23 of the shaft is tapered to fit snugly the tapered bore 12 of a wheel 10 and thus to support the wheel without any looseness or shake with its A lines at equal angles to the plane 21. Above the cone 23, the shaft is of slightly less diameter than the top of the cone and is accurately cylindrical, and is formed in its upper portion with a longitudinal key slot 24. A straight radial line B visible in the drawings only at its end point in Fig. 2 is scribed on the surface 21 extending out from the shaft 22 in a plane through the axis of the shaft and accurately at right angles to the plane through the axis of the shaft and through the center of the slot 24.

A wheel 10, having been placed in position on the shaft 22, as shown, is turned thereon until the A line of the blade 14 is approximately vertically over, i. e., coplanar with the B line. A counterbored collar 25 is placed down over the shaft to rest, as shown, on the hub 11 of the wheel. A helical spring 26 is slipped down over the shaft and into the counterbore of the collar to be supported by the collar. A large hub 27 is fitted down over the shaft to be supported on the spring, and is rotatable on the shaft in bearing members 28 and 29 accurately formed to allow the hub to rotate freely on the shaft but without looseness or shake. A large dial disk 30 is mounted concentrically on the upper end of the hub 27 to be rigidly rotatable therewith.

At about mid-length of the hub 27 is rigidly mounted thereon a horizontally extending arm 31 to be rotatable about the shaft with the hub, and is formed along its under side with an accurately radial male dovetail 32. A jam screw 33 mounted in the hub to bear at its end against the shaft 22 serves to releasably lock the hub in any adjusted position on the shaft. A collar 34 freely but snugly rotatable on the shaft 22 fits down over the shaft and rests on the disk 30; and a screw 35 (Fig. 2 only) is mounted radially in the collar and has its inner end 36 formed to a snug sliding fit in the slot 24, so that the collar 34 may slide freely up and down on the shaft 22 but cannot turn thereon.

The lower part 37 of the collar 34 is reduced in diameter and serves as pivot for a flat sector member 38. A vertical locking bolt 39, with a knurled nut 40, is mounted in the sector 38 offset from the pivot axis and extends up through an arcuate slot 41 in the collar 34. The nut 40 bearing against the collar serves to lock the sector 38 and collar 34 together and permits the relative angular positions of the collar and sector to be adjusted within the limits set by the end walls of the slot 41.

A gauge member generally indicated at 42 has a horizontal arm 43 formed with a female dovetail to engage the male dovetail 32 on the arm 31 and slide snugly but freely thereon, and has a vertically depending arm 44 whose lower end is formed to follow approximately but with appreciable clearance the upper surface of the blade 14 when the several parts are arranged, as shown. A series of vertical locking bores 45, 46, 47 and 48 is formed in the arm 31, as shown; and the member 43 is formed with a similar bore 49. The member 42 may be locked in the position shown on the arm 31 by means of a pin 50 inserted into the bores 48 and 49 when these are in axial registry. The bores 45, 46, and 47 may be used similarly in the case of smaller wheels than the wheel 10 shown to correspondingly lock other gauge members similar to the member 42 in other positions on the arm 31.

The inner face 60 of the member 44 is cylindrically curved to the radius of this face from the axis of the shaft 22 when the member is in the position shown, and a gauge proper in the form of a sheet metal member 51 is held rigidly and snugly conformed to this cylindrical face by screws 52. The slanting lower end of the member 44 is bevelled as shown at 53 to a blunt edge 54 where the end face meets the cylindrical inner face. As noted above, this edge 54 conforms to the blade 14 with a liberal clearance when the various parts are assembled as shown. The member 51 has its lower edge 55 formed to conform exactly to the correct upper surface of the blade 14 (or 15 or 16). The outer face of the member 51 is provided with a vertical index line C; and the member 44 may be notched as at 56, if desired, to render a convenient length of the line C visible.

The dial 30 bears on its upper periphery three arcuate scales D, E, and F, whose zero points are exactly 120° apart and which are graduated both ways from their central zeros in angular measure. Also the sector 38 is graduated with an arcuate scale positioned and adapted to be matchable as hereinafter described with either of the scales D, E, or F, and graduated both ways from a central zero with a scale G applicable as a vernier to either of the scales D, E, or F. Furthermore, the zero of the D scale is accurately in a plane determined by the line C and the axis of the shaft.

In operation the wheel 10 to be gauged is placed in position on the shaft 22 as shown and adjusted rotatably until the A line on its blade 14 is approximately in a vertical plane through the line B on the base surface 21. This can easily and conveniently be done with an error within say 10° either way, and one of the purposes and advantages of the invention is to allow a reasonable inaccuracy of this kind in the positioning of the article to be gauged in the apparatus. It is ordinarily a very difficult and time consuming matter to place on a support having a curved supporting surface an article having a correspondingly curved surface, on which it is to be supported, with any great accuracy of relative position, especially if there is any wedging (as in the cone 12 on the cone 23); and it becomes practically impossible if hammering or screw pressure to adjust one to the other is prohibited as in the case of the marine wheel used illustratively here.

The wheel 10 having been thus set in position with its A line approximately vertically over the line B, the collar 25 and spring 26 are slipped down over the shaft and the hub 27 with its arm 31 are placed as shown to rest on the spring 26. The gauge member 42 may be placed in position on the arm 31 either before or after the hub and arm assembly is slipped over and down the shaft. Preferably, for convenience of adjustment and operation, the spring 26 is stiff enough to hold the edge 55 clear of the blade 14 while yet the hub, arm, and gauge assembly may be easily forced down against the spring tension to bring the edge 55 into contact with the blade. The hub and arm are adjusted so that the edge 55 is in contact with the blade with the line C accurately intersecting the A line of the blade 14 and the parts are locked in this position by means of the jam screw 33. The collar 34 is then placed down over the shaft to rest on the plate 30 and with its guide 36 in the slot 24.

The A line of the blade 14 is now approximately in the vertical plane of the B line of the base. But the C line of the gauge 42 is accurately in the vertical plane of the A line of the blade, and the zero of the D scale of the disk 30, the disk being rigid with the hub 27, arm 31 and gauge 42, is accurately in the plane of the A line and C line. The nut 40 is loosened and the sector plate 38 adjusted until the zero of the vernier scale G coincides with the zero of the D scale. The zero of the vernier is then accurately in the vertical plane of the A line of the arm 14, and the nut 40 is tightened to lock the vernier to the collar 34 in this relation.

Now the jam screw 33 is loosened. The hub 27 and arm 31 may then be raised until the member 51 can be swung past the high point of the blade 15 and adjusted on the blade 15 with the C line of the gauge accurately on the A line of the blade 15 and the whole locked in place with the screw 33. During this motion of the hub 27, the collar 34 rises and falls on the shaft 22 with the hub, but the collar cannot turn because of the guide 36 in the slot 24, and the vernier plate 38 remains in its angular position. The disk 30, however, rotates with the hub 27 and brings the E scale into registration with the vernier G scale. The zeros of the D and E scales being accurately 120° apart, the zero of the E scale should now register exactly with the zero of the vernier since the A line of the blade 15 should be 120° from the A line of the blade 14. Deviation from the desired ideal condition may then be determined as to both amount and direction by the vernier G scale and the E scale. In similar fashion the accuracy of location of the A line of the blade 16 with respect to the A line of the blade 14 may be determined by bringing the C line into registration with the A line of the blade 16 and thus bringing the F scale into registration with the vernier G scale.

It is to be noted that the members 44 and 51 are arranged and shaped to give a gauging edge 55 adapted to be accurately fittable across an arcuate linear element of the upper surfaces of the blades 14, 15, and 16, although actually only the point where the C line on 51 meets the edge 55 is of significance for the present invention. The present application is one of a group of five copending applications filed on the same date by the same inventor closely related, being directed to various modifications of one apparatus for various purposes, the other four applications being Serial Nos. 683,180, now Patent 2,470,636, 683,181, 683,182, and 683,183. Each of this group of applications discloses features disclosed in one or more of the others and claimed in one of the others, the drawings being made from an apparatus modifiable by removal, exchange, or addition of parts to embody and subserve the purposes of each of the several inventions of the group. Applicant does not intend the disclosure here of patentable novelty not claimed herein to be a dedication to the public of such novelty, but has presented claims to such features in one or other of copending applications, Serial Nos. 683,180, now Patent 2,470,636, 683,181, 683,182, 683,183. Thus in the present case, the structure and method of constructing the gauge arm 44 with its gauge proper 51 are no part of the present invention but are disclosed and claimed in copending application, Serial No. 683,183.

Similarly, an apparatus generally like that herein disclosed but in which a gauge member such as 51 with a linearly extended gauging edge 55 is employed for gauging an extended surface is also no part of the present invention, being disclosed and claimed in copending application, Serial No. 683,181.

What is claimed is:

1. A gauging apparatus to test the angular distribution of portions of an article about a bore in the article, said apparatus comprising a base, a shaft rigidly positioned on the base to support an article to be gauged, a gauging member slidably mounted on the shaft to be movable thereon in one direction into and out of predetermined positional relation to a specific portion of the article so supported and also rotatably mounted on the shaft to be movable thereon in another direction to be brought into similar relation to another specific portion of the article, means to releasably lock the gauging member in either of said positional relations, a measuring member slidably and rotatably mounted on the shaft, means to releasably lock the measuring member against rotation relative to the shaft, and cooperating scales on the gauging member and on the measuring member to measure the deviation of the various portions of the article from the required angular distribution.

2. A gauging apparatus to test the angular distribution of portions of an article about a bore in the article, said apparatus comprising a horizontal base, a vertical shaft rigidly supported on the base and dimensioned to fit the bore in an article to be gauged, an arm both slidably and rotatably mounted on the shaft, resilient means loosely positioned on the shaft and interposed between the arm and an article positioned on the shaft to resiliently support the arm on the shaft, a gauging member mounted on the arm and thereby movable on the shaft into and out of corresponding predetermined positional relationships with any of a plurality of specific portions of the article to be gauged, means to releasably lock the arm against motion on the shaft, a measuring member both slidably and rotatably mounted on the shaft, means to releasably lock the measuring member against rotation on the shaft, and cooperating scales on the gauging member and on the measuring member to measure the deviation of the various portions of the article from the required angular distribution.

EARL C. MOSS.

REFERENCES CITED

The following references are of record in the file of this patent:

UNITED STATES PATENTS

| Number | Name | Date |
|---|---|---|
| 1,547,380 | Godfrey | July 28, 1925 |
| 1,902,180 | Prior | Mar. 21, 1933 |
| 2,078,138 | Hansen | Apr. 20, 1937 |
| 2,172,368 | Eby | Sept. 12, 1939 |
| 2,265,373 | Johnson | Dec. 9, 1941 |

FOREIGN PATENTS

| Number | Country | Date |
|---|---|---|
| 29,049 | Norway | Sept. 2, 1918 |
| 187,807 | Germany | July 30, 1907 |